United States Patent Office 3,575,959
Patented Apr. 20, 1971

3,575,959
5'-SUBSTITUTED RIBOFURANOSYL NUCLEOSIDES
Tsung-Ying Shen, Westfield, and William V. Ruyle, Scotch Plains, N.J., and Thomas Neilson, Burlington, Ontario, Canada, assignors to Merck & Co., Inc., Rahway, N.J.
No Drawing. Continuation-in-part of abandoned application Ser. No. 659,046, Aug. 8, 1967. This application May 13, 1969, Ser. No. 824,271
Int. Cl. C07d 51/52, 51/54
U.S. Cl. 260—211.5      8 Claims

ABSTRACT OF THE DISCLOSURE

Novel (5-substituted - 5 - deoxyribofuranosyl) - purines and pyrimidines where the 5-substituent is acetylthio, thiocyano, azido, alkylamino, or fluoro, are prepared by reaction of a (2,3-O-isopropylidene - 5 - O - tosylribofuranosyl)-purine or pyrimidine with an alkali metal thioacetate, thiocyanate, azide, alkylamino, or fluoride, respectively. The 5'-azido-group is then hydrogenated to a 5'-amino-group.

The (5-amino-5-deoxy - 2,3 - O - isopropylidene-ribofuranosyl) purine or pyrimidine is then reacted with an alkanoyl halide or anhydride, adamatoyl halide, ethyl chloroformate or potassium cyanate to produce the corresponding 5-alkanoylamino, adamantoylamido, N-carboethoxyamino, ureido, or cyanamido-derivative, respectively. The 5-cyanamido-derivative is further reacted with ammonia in an amine to give the corresponding 5-guanidino derivative. The purine derivatives may be substituted at the 2,6-positions of the purine nucleus and the pyrimidine derivatives (e.g. cytidine or uridine) may be substituted at the 5-position of the pyrimidine nucleus.

The (5-substituted-5-deoxyribofuranosyl)-purines and pyrimidines have antiviral activity against Herpes, Vaccinia and Adeno II viruses, and are also useful in vitio as nucleoside antimetabolites, and as nucleic acid biosynthesis inhibitors.

---

This application is a continuation-in-part of our copending application, U.S. Ser. No. 659,046, filed Aug. 8, 1967 now abandoned.

This invention relates to novel ribofuranosyl nucleosides. More particularly, this invention relates to (5-substituted-5-deoxyribofuranosyl) purines and (5 - substituted-5-deoxyribofuranosyl) pyrimidnes.

The novel compounds of this invention are the nucleosides represented by Formulas A and B and the 2',3'-O-isopropylidene or 2',3' - O - diacetyl derivatives thereof.

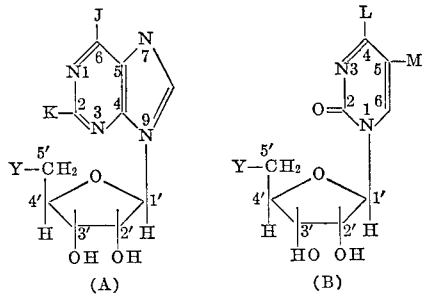

(A)     (B)

wherein:
Y is

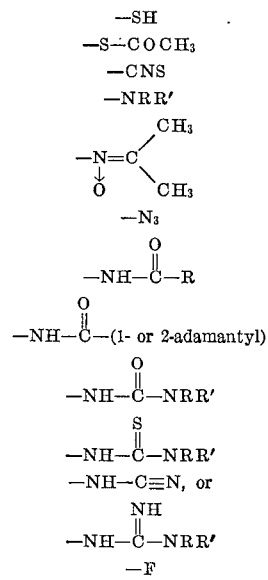

R and R' are each hydrogen or lower alkyl;
J and K are the same or different hydrogen, halogen, hydroxy, mercapto, lower alkylmercapto, benzylmercapto, amino, lower-alkyl-substituted-amino, or benzylamino;
L is lower alkoxy, hydroxy, amino, or lower-alkyl-substituted amino; and
M is hydrogen, lower alkyl, halogen, halogenated lower alkyl, amino, lower-alkyl-substituted amino, benzylamino, mercapto, lower-alkyl-mercapto or benzylmercapto;

provided that in the case of the 2',3'-di-O-hydroxy-compounds, when Y is azido, amino or acetamido, Z is not derived from an unsubstituted adenine, guanine, or uracil moiety, and further provided that when Y is fluoro, Z is not derived from a uracil or cytosine moiety or from a purine in which J is hydrogen, halogen, mercapto, or amino.

In this specification the term "nucleoside" is used to refer to the above defined compounds where Y' is hydroxy, or other specified derivatives thereof.

The compounds of the present invention have demonstrated a variety of valuable utilities. They are capable of inhibiting ribonucloic acid (RNA) synthesis, for example, acid insoluble RNA synthesis, in Ehrlich ascitos cells and KB cells. In in vitro tests, the growth of KB cells is markedly suppressed as is the incorporation of hypoxanthine into acid insoluble RNA. The compounds are therefore useful as antimetabolites as cell growth inhibitors and for the study of metabolism systems. They also demonstrate favorable cytotoxicity characteristics considered with their cell growth depression. In addition, they show a marked resistance to the action of adenosine deaminase. They are also useful as antiviral agents against Herpes, Vaccinia and Adeno II viruses in standard test procedures.

The nucleosides may also be converted to nucleotides by treatment with phosphoric acid derivatives in accordance with known techniques. As such, they are useful in formulation of media for selective culturing of animal tissue cells.

According to this invention a 9-(β-D-ribofuranosyl)-purine which may be substituted at the 2- and/or 6- positions of the purine nucleus, or a 1-(β-D-ribofuranosyl)-2(1H)-pyrimidinone which may be substituted at the 5-position of the pyrimidinone nucleus is converted into the 2',3'-O-isopropylidene-derivative. Conveniently, this reaction is carried out by reaction with dimethoxypropane at room temperature overnight. Conventional methods, such as reaction with acetone and a dehydrating agent under midly acid conditions, can also be employed.

The 2',3'-O-isopropylidene-nucleoside is then converted into a 5'-O-aryl(or alkyl)sulfonyloxy-derivative. The 5'-O-tosyl-derivative is preferred, but the 5'-O-mesyl or 5'-O-benzenesulfonyl-derivative may also be used. Suitably, the 5'-O-tosyl-derivative is prepared by reacting the 2',3'-O-isopropylidene-nucleoside with tosyl chloride at −20° to about 0° C. for about two days. At a higher temperature, the time may be shortened. In the description which follows, the preferred tosyl derivative is specified for simplicity, but it is understood that in each instance the 5'-O-benzenesulfonyl- or 5'-O-mesyl-derivative can likewise be employed.

The 2' - 3' - O - isopropylidene-5'-O-tosyl nucleoside is then reacted with the appropriate alkali metal salt in a solvent to bring about a nucleophylic displacement of the 5'-sulfonyloxy group. Lithium, sodium, or potassium salts may be used. The preferred solvent is dimethyl sulfoxide; other solvents which are useful in this procedure include dimethyl formamide and the like.

Formation of an anhydro cyclization derivative of adenosine (or N⁶-aliphatic hydrocarbon derivative thereof) as a by-product is avoided by first preparing the N⁶-formyl-derivative of the adenosine compound as a protecting group. This can be accomplished, for example, by dissolving the adenosine compound in a mixture of equivalent quantities of formic acid and acetic anhydride, and allowing the mixture to stand at room temperature for 1–2 days.

In the general description which follows the preparation of compounds having various substituents at Y is illustrated using adenosine as the nucleoside. However, it is to be understood that each of these reactions will likewise take place with other 9-(β-D-ribofuranosyl)-purine or 1-(β-D-ribofuranosyl)-2(1H)-pyrimidinone compounds, however in many instances the N⁶-formyl-protecting group will not be indicated.

The 5' - acetylthio-5'-deoxy-N⁶-formyl-2',3'-O-isopropylideneadenosine is prepared by reaction of the N⁶-formyl-2',3'-O-isopropylidene-5'-O-tosyladenosine with an alkali metal thioacetate in a solvent at an elevated temperature for several hours. Suitable solvents are acetone or methyl ethyl ketone, and the reaction is conveniently carried out at the reflux temperature of the solvent for about 4–10 hours. Anhydrous conditions are necessary. The formyl group is removed in a conventional manner, for example, by dissolving the compound in a dilute aqueous solution of an organic acid, preferably formic acid, and allowing the mixture to stand for 1–7 days. All operations are carried out in an inert atmosphere to control the formation of disulfide materials. The 2',3'-O-acetyl-5'-acetylthio-5'-deoxyadenosine is obtained by adding acetic anhydride and an organic base such as trialkylamine or pyridine to the adenosine compound and allowing the mixture to stand at room temperature for 1–7 days. Acetyl halide could likewise be used.

5' - deoxy-2',3'-O-isopropylidene-5'-mercapto-adenosine is prepared by dissolving 5'-acetylthio-5'-deoxy-N⁶-formyl-2',3'-O-isopropylideneadenosine in an alkanol, preferably methanol, saturated with ammonia or a lower alkylamino. After standing for 30–40 minutes at room temperature, the product can be recovered in good yield by chromatography on a silica column using a mixture of methylene chloride and methanol.

The 5'-thiocyano - 5' - deoxyadenosine is prepared by reaction of the N⁶-formyl - 2',3' - O - isopropylidene-5'-O-tosyladenosine with an alkali metal thiocyanate in a solvent at an elevated temperature. Suitable solvents are acetone and methyl ethyl ketone; the reaction is conveniently carried out at the reflux temperature of the solvent (60°–100° C.) for about 4–10 hours, depending on the temperature employed.

The 5' - amino-5'-deoxy-2',3'-O-isopropylidene-adenosine is prepared by hydrogenating the corresponding 5'-azido compound. N⁶-formyl-2',3'-O - isopropylidene-5'-O-tosyladenosine is heated with an alkali metal azide in a solvent such as dimethylsulfoxide, dimethylformamide and the like to 20–40 minutes. The formyl group is then removed in a conventional manner by dissolving in a dilute solution of an organic acid, preferably formic acid, and allowng the mixture to stand for 1–7 days. The 5'-azido-5'-deoxy-2',3'-O-isopropylideneadenosine is then reduced, for example, by hydrogenation in a solvent using Raney nickel as a catalyst to obtain the corresponding 5'-amino-derivative.

The 5'-alkylamino-5'-deoxyadenosine compounds are obtained by heating N⁶-formyl-2',3'-O-isopropylidene-5'-adenosine in a bomb with an alkylamine at about 60°– 100° C. for 6–10 hours.

The 5'-isopropylideneaminoadenosine N⁵'-oxide is prepared by heating N⁶-formyl-2',3'-O-isopropylidene-5'-O-tosyladenosine with acetyl oxime and sodium hydride, and then removing the 2',3'-O-isopropylidene group in a conventional manner.

The 5'-alkanoylamino-derivative of 5'-amino-5'-deoxy-2',3'-O-isopropylideneadenosine is obtained by dissolving the 5'-amino-5'-deoxy-2',3'-O-isopropylideneadenosine in a solvent containing an organic base, and then adding acetic anhydride after cooling to about −20° C. to +10° C. The reaction mixture is then allowed to stand for 1–2 hours at room temperature. The 2',3'-O-isopropylidene group can be removed in a conventional manner by dissolving in a dilute acid.

5'-(1- or 2-adamantamido)-5'-deoxyadenosine is obtained by treating a solution of 5'-amino-5'-deoxy-2',3'-O-isopropylideneadenosine with a slight excess of 1- or 2-adamantoyl halide in the presence of an organic base.

5'-N-carboethoxyamino-5'-deoxyadenosine is obtained adding ethyl chloroformate to a solution of 5'-amino-5'-deoxy-2',3'-O-isopropylideneadenosine and an organic base to about 0° C. and then allowing the reaction mixture to stand for 6–10 hours.

5'-deoxy-5'-ureidoadenosine can be prepared from an aqueous or alcoholic solution of 5'-amino-5'-deoxy-2',3'-O-isopropylideneadenosine by warming at 60° to 100° C. with an alkali metal cyanate, or from 5'-cyanamido-5'-deoxy-2',3'-O-isopropylideneandenosine by dissolving in aqueous formic acid solution and allowing the solution to stand at ambient temperatures for 1–2 days.

5'-deoxy-5'-thioureidoadenosine is prepared by reacting an aqueous or alcoholic solution of 5'-amino-5'-deoxy-2',3' - O - isopropylideneadenosine with an alkali metal thiocyanate at 60° to 100° C.

5'-cyanamido - 5' - deoxy-2',3'-O-isopropylideneadenosine is obtained by adding an alcoholic solution of cyanogen halide in about 10% to 20% excess to an alcoholic solution of the adenosine compound at room temperature. The reaction mixture is warmed at the reflux temperature and then left at room temperature for 1–3 hours.

5'-guanidine- or 5'-(alkyl)-guanidine-5'-deoxyadenosine is produced by refluxing a solution of the 5'-cyanamido - 5' - deoxy-2',3'-O-isopropylideneadenosine and anhydrous ammonium chloride in concentrated ammonia solution or in an aqueous solution of an alkylamine for 1–2 hours.

5'-fluoro-5'-deoxyadenosine is produced by heating a solution of N⁶-acyl - 2',3' - O - isopropylidene-5'-O-tosyladenosine and potassium fluoride in alcohol in a sealed vessel at 100–200° for several hours, followed by removal of the protecting groups.

In place of adenosine in each of the above reactions, 9-(2,3 - O - isopropylidene-5-O-tosyl-β-D-ribofuranosyl) purine, which is substituted in the 2- and/or 6-positions by the same or different hydrogen, halogen, hydroxy, mercapto, lower-alkyl-mercapto, benzylmercapto, amino, lower-alkyl-substituted-amino or benzyl groups, can likewise be employed. Preferably, a 6-amino group in the purine ring is protected, for example, with an acyl group such as formyl in order to avoid formation of a cyclic anhydro compound as a by-product.

In place of adenosine in each of the above examples, there may be used as starting materials, uridine, 5-trifluoromethyluridine, or thymidine. These starting compounds are then converted into the corresponding 5'-substituted-5'-deoxyuridine or thymidine compounds as outlined in the above procedure.

For the preparation of some of the compounds of the present invention, additional steps may be required. Uridine derivatives which have a halogen group at the 5-position of the pyrimidine ring are obtained by halogenation, using conventional methods. For example, 5'-azido-5'-deoxy-5-bromouridine is obtained by treating 5'-azido-5'-deoxyuridine with bromine in aqueous solution. The 5-halo group can then be replaced by ammonia or an amine to obtain the 5-amino or 5-alkyl-substituted-amino-derivative, or by the alkali metal salt of a mercapto to obtain the corresponding 5-mercapto- or 5-alkyl-mercapto derivative. Compounds which have an amino or substituted-amino group at the 4-position are prepared from the corresponding 5'-substituted-5'-deoxyuridine compound by thiation at the 4-position of the pyrimidine ring, followed by treatment with ammonia or an amine.

The following examples illustrate methods of carrying out the present invention but it is to be understood that they are given for purposes of illustration and not of limitation.

EXAMPLE 1

5'-acetylthio-5'-deoxyadenosine

Step A: Preparation of 5' - acetylthio - 5' - deoxy-$N^6$-formyl - 2',3' - O - isopropylideneadenosine.—$N^6$-formyl-2',3'-O-isopropylidene-5'-tosyladenosine (8.6 g.) and 10.5 g. of potassium thioacetate (predried overnight at room temperature over high vacuum) are refluxed together with stirring in methyl ethyl ketone (125 ml.) for 5 hours. The solvent is replaced by methylene chloride and then washed three times with 50 ml. portions of water. The organic layer is dried over magnesium sulfate and then evaporated to 10 ml. It is then placed on a silica gel column and washed with copious amounts of methylene chloride. Elution with 2% methanol-methylene chloride gives the desired compound, which crystallizes from acetone-petroleum ether, M.P. 80–81° C. (yield 5.5 g., 80%).

Analysis.—Calculated for $C_{16}H_{19}N_5O_5S$ (percent): C, 48.8; H, 4.85; N, 17.8; S, 8.15. Found (percent): C, 48.66; H, 4.65; N, 17.79; S, 8.18.

Step B: Preparation of 5'-acetylthio-5'-deoxy-2',3'-O-diacetyladenosine.—5' - deoxy-5'-S-acetyl-$N^6$-formyl-2',3'-O-isopropylidene-adenosine (500 mg.) is dissolved in formic acid (3 ml.) and water (3 ml.) and left at room temperature for one week. Progress is noted on a daily basis. An intermediate is formed almost immediately which proceeds slowly to the completely unblocked thionucleoside. Removal of the solvent gives the crude product. All operations are done under nitrogen to control the formation of disulfide materials.

Pyridine (5 ml.) and acetic anhydride (2 ml.) are added carefully to the oily residue and left overnight at room temperature. The product is recovered by addition of water (10 ml.) and extraction three times with 10 ml. portions of methylene chloride. The methylene chloride extract is washed twice with 10 ml. portions of water and dried over magnesium sulfate. The solution is placed directly onto a silica gel column and eluted with a mixture of methylene chloride and 3% methanol. The product is obtained as a foam.

Analysis.—Calculated for $C_{16}H_{19}N_5O_6S$ (triacetate), percent: C, 47.8; H, 4.67; N, 17.07; S, 7.82. Found (percent): C, 47.51; H, 4.46; N, 16.82; S, 8.34.

EXAMPLE 2

5'-deoxy-2',3'-O-isopropylidene-5'-mercaptoadenosine

5'-acetylthio-5'-deoxy-$N^6$-formyl-2',3'-O-isopropylideneadenosine (2.5 g.) is dissolved in methanol (100 ml.) saturated with ammonia at room temperature. The solution is allowed to stand for 40 minutes. The methanol is then replaced with methylene chloride (100 ml.) and methylene chloride solution is placed on a silica gel column. Elution with a mixture of 3% methanol and methylene chloride gives the 5-'deoxy-2',3'-O-isopropylidene-5'-mercaptoadenosine, M.P. 198° C. (yield 68%).

Analysis.—Calculated for $C_{13}H_{17}N_5O_3S$ (percent): C, 48.3; H, 5.31; N, 21.4; S, 9.92. Found (percent): C, 48.34; H, 5.04; N, 21.66; S, 10.14.

EXAMPLE 3

5-deoxy-5'-thiocyanoadenosine

Step A: Preparation of 5'-deoxy-$N^6$-formyl-5'-thiocyanoadenosine.—$N^6$-formyl-2',3' - O - isopropylidene-5'-tosyladenosine (6 g.) and sodium thiocyanate (12 g.) are refluxed together in methyl ethyl ketone (250 ml.) overnight with stirring. Sodium tosylate (2.5 g.) separates out and is filtered off. The reaction solvent is replaced by 250 ml. of methylene chloride. The product is washed four times with 50 ml. portions of water. Evaporation gives a gum which is purified by chromatography to afford the product, M.P. 100° C. (yield 1 g., 22%).

Analysis.—Calculated for $C_{15}H_{16}N_6O_4S$ (percent): C, 47.8; H, 4.28; N, 22.30; S, 8.52. Found (percent): C, 47.73; H, 4.51; N, 22.35; S, 8.33.

Step B: Preparation of 5'-deoxy-thiocyanoadenosine, acetyl derivatives.—The product of Step A (300 mg.) is dissolved in formic acid (2 ml.) and water (2 ml.) and left at room temperature for 6 days. The solvent is removed to give a gum which is dissolved in aqueous ammonia and then reevaporated to form a gum.

The gum is dissolved in a mixture of pyridine (10 ml.) and acetic anhydride (2 ml.) and left overnight. Ethanol (20 ml.) is added, and, after 15 minutes, the solution is evaporated under vacuum. Methylene chloride (20 ml.) is added. The product is washed three times with 20 ml. portions of water, and then dried over magnesium sulfate. It is then placed on a silica gel column and eluted with 5% methanol-methylene chloride.

EXAMPLE 4

5'-amino-5'-deoxy-2',3'-isopropylideneadenosine

Step A: Preparation of 5'-azido-5'-deoxy-2',3'-O-isopropylideneadenosine.—$N^6$ - formyl - 2',3' - O - isopropylidene-5'-tosyladenosine (5 g.) is dissolved in 55 cc. of dimethyl sulfoxide, and sodium azido (3.5 g.) is added. The mixture is heated at 100° C. on a hot plate for 30 minutes. The product is poured into ice water, and then extracted with methylene chloride. The extract is washed twice with water, dried, and then evaporated under vacuum to obtain the crude product which is used in the next step without purification.

Methanol (100 ml.) saturated with ammonia is added and the mixture is left for 1 hour, the course of the reaction being followed by thin layer chromatography. Evaporation of the solvent under vacuum and extraction with chloroform gives a colorless oil which is crystallized from a mixture of ethyl acetate and petroleum ether to give 2 g. of the crystalline product, M.P. 141° C., 5'- azido-5'-deoxy - 2',3' - O - isopropylideneadenosine (yield 76%).

Step B: Preparation of 5'-amino-5'-dexoy-2',3'-O-isopropylideneadenosine.—5'-azido-5'-deoxy - 2',3' - O - isopropylideneadenosine (1.5 g.) is dissolved in methanol and shaken overnight with Raney nickel (½ tsp.) under hydrogen at 40 p.s.i. pressure. The catalyst is removed by filtration, and the filtrate is evaporated under vacuum to give a colorless oil which is crystallized from ethyl acetate, M.P. 210° C. (yield 1.3 g., 94%).

Analysis.—Calculated for $C_{10}H_{16}N_8O_3$ (percent): C, 47.0; H, 4.68; N, 33.7. Found (percent): C, 47.48; H, 4.71; N, 34.36.

EXAMPLE 5

5'-deoxy-5'-methylaminoadenosine dihydrochloride

Step A: Preparation of 5'-deoxy-2',3'-O-isopropylidene-5'-methylaminoadenosine.—$N^6$ - formyl-2',3'-O-isopropylidene-5'-tosyladenosine (3 g.) and methylamine (20 ml.) are placed in a bomb and heated overnight at 80° C. The excess methylamine is allowed to evaporate, and the residue is taken up in chloroform (50 ml.). The chloroform extract is washed twice with 25 ml. of water and evaporated to give a glass. Crystallization from a mixture of ethyl acetate and petroleum ether affords 1.5 g. of a crystalline product, M.P. 185° C. (yield 76%).

Step B: Preparation of 5'-deoxy-5'-methylaminoadenosine dihydrochloride.—The above glass (700 mg.) is dissolved in formic acid (10 ml.) and water (10 ml.) and left for two days at room temperature. The evaporation of the solvent gives a gum which is dissolved in 2 N hydrochloric acid solution (2.3 ml.). A solid product (450 mg.), identified as the dihydrochloride, separates on addition of ethanol, and is crystallized from aqueous ethanol, M.P. 184–185° C. (yield 55%).

Analysis.—Calculated for $C_{11}H_{16}N_6O_3 \cdot 2HCl \cdot H_2O$ (percent): C, 35.55; H, 5.43; N, 22.65; Cl, 19.1. Found (percent): C, 35.57; H, 5.22; N, 22.66; Cl, 18.88.

EXAMPLE 6

5'-deoxy-5'-dimethylaminoadenosine hydrochloride

Step A: Preparation of 5'-deoxy - 5' - dimethylamino-2',3'-O-isopropylideneadenosine.—$N^6$ - formyl - 2',3' - O-isopropylidene-5'-tosyladenosine and dimethylamine (30 ml.) are placed in a bomb at 80° C. overnight. Excess methylamine is allowed to evaporate and the known residue is dissolved in chloroform (100 ml.). This solution is washed in water (2× 50 ml.), dried, and evaporated to an oil which crystallizes from a mixture of chloroform and petroleum ether, M.P. 124° C. (yield 2.45 g., 92%).

Analysis.—Calculated for $C_{15}H_{22}N_6O_3$ (percent): C, 53.9; H, 6.63; N, 25.12. Found (percent): C, 54.12; H, 6.39; N, 25.22.

Step B: Preparation of 5'-deoxy-5'-dimethylaminoadenosine hydrochloric.—The above product (700 mg.) is dissolved in formic acid (5 ml.) and water (5 ml.). This solution is left for two days at room temperature. Evaporation of the solvent under vacuum gives a gum which is taken up in 2 ml. N hydrochloric acid. Further evaporation gives a solid which is exhaustively evaporated with water (2× 10 ml.). Addition of ethanol gives crystals (450 mg.), 66% yield. Recrystallization from a mixture of ethanol and ethyl acetate gives a product, M.P. 225° C. dec.

Analysis.—Calculated for $C_{12}H_{18}N_6O_3 \cdot HCl \cdot C_2H_6O$ (percent): C, 44.6; H, 6.66; N, 22.3; Cl, 9.45. Found (percent): C, 44.73; H, 6.01; N, 22.31; Cl. 9.91.

EXAMPLE 7

5'-isopropylideneaminoadenosine $N^{5'}$-oxide

Step A: Preparation of $N^6$-formyl-5'-isopropylideneamino-2',3' - O - isoproylideneandenosine $N^{5'}$-oxide.—$N^6$-formyl-2',3'-O-isopropylidene-5'-tosyladenosine (4 g.) is added to the stirred mixture of acetone oxime (4 g.) and sodium hydride (1.3 g.) in benzene (100 ml.). The reaction mixture is refluxed for 2 hours. On cooling, the benzene is replaced by methylene chloride (100 ml.). The solution is then washed three times with 50 ml. portions of water and dried over magnesium sulfate. The product is separated by chromatography, using a silica gel column and eluting with a mixture of 2% methanol in methylene chloride.

Step B: Preparation of 5'-isopropylideneamino-2',3'-O-isopropylideneadenosine $N^{5'}$-oxide.—$N^6$-formyl-5'-isopropylideneamino-2',3'-O-isopropylideneadenosine $N^{5'}$-oxide (320 mg.) is dissolved in a saturated solution of 50 ml. of ammonia in methanol. The reaction is followed by thin layer chromatography and is complete in 1 hour. The solution is evaporated to dryness under vacuum and the residue dissolved in 50 ml. of chloroform. This solution is washed three times with 50 ml. of water, dried, and evaporated to dryness to give a colorless oil which, on crystallization from a mixture of ethyl acetate and petroleum ether, gives needles (yield 250 mg., 84%). This material is also obtained as a byproduct in Step A.

Analysis.—Calculated for $C_{16}H_{22}N_6O_4$ (percent): C, 53.03; H, 6.12; N, 23.19. Found (percent): C, 52.25; H, 6.07; N, 22.73.

Step C: Preparation of 5'-isopropylideneaminoadenosine $N^{5'}$-oxide.—5'-isopropylideneamino-2',3' - O - isopropylideneadenosine $N^{5'}$-oxide (150 mg.) is dissolved in 44% aqueous formic acid solution (5 ml.) and left for 2 days at ambient temperatures. The reaction is followed by thin layer chromatography. The reaction mixture is evaporated to dryness under vacuum, and then repeatedly evaporated with three 10 ml. portions of water to give an oil which crystallizes from ethyl acetate-petroleum ether as needles (yield 40 mg., 30%), M.P. 163–164° C.

EXAMPLE 8

5'-acetamido-5'-deoxyadenosine

Step A: Preparation of 5'-acetamido-5'-deoxy-2',3'-O-isopropylideneadenosine.—5'-amino - 5' - deoxy - 2',3'-O-isopropylideneadenosine (2.04 g.) is dissolved in a mixture of pyridine (5 ml.) and methylene chloride (20 ml.). Acetic anhydride (0.63 ml., 1.08 equivalents), is added carefully to the stirred solution at 0° C. The reaction mixture is stirred for one hour longer, and then left at room temperature overnight. Thin layer chromatography shows the reaction to be complete. The reaction mixture is then washed three times with 20 ml. portions of water, and taken to a white solid under vacuum. The last traces of pyridine are removed by azeotropic distillation with two 10 ml. portions of toluene. Crystallization with a mixture of ethyl acetate and petroleum ether gives the product, M.P. 167–168° C. (yield 2.05 g., 88%).

Analysis.—Calculated for $C_{15}H_{20}N_6O_4$ (percent): C, 51.71; H, 5.79; N, 24.13. Found (percent): C, 51.50; H, 5.67; N, 23.77.

Step B: Preparation of 5'-acetamido-5'-deoxyadenosine.—5' - acetamido - 5' - deoxy-2',3'-O-isopropylideneadenosine (2.05 g.) is dissolved in formic acid (10 ml.) and water (10 ml.) and left at room temperature for 2 days. The formic acid is removed by exhaustive evaporation with four portions of 10 ml. of water, and the residue is taken up with a further 10 ml. of water. The pH of the solution is adjusted to 8–9 with concentrated ammonia (1–2 drops). 1.74 g. (96%) of the product separates out on standing, M.P. 175–176° C.

Analysis.—Calculated for $C_{12}H_{16}N_6O_4 \cdot 1H_2O$ (percent): C, 44.17; H, 5.56; N, 25.76. Found (percent): C, 44.42; H, 5.70; N, 26.27.

EXAMPLE 9

5'-(1-adamantamido)-5'-deoxyadenosine

Step A: Preparation of 5'-(1-adamantamido)-5'-deoxy-2',3'-O-isopropylideneadenosine.—5' - amino - 5' - deoxy-2',3'-O-isopropylideneadenosine (501 mg.) is dissolved in a mixture of pyridine (3 ml.) and methylene chloride (30 ml.). A solution of 1-adamantoyl chloride (327 mg., 1.1 equivalents) in methylene chloride (10 ml.) is added at 0° C., with stirring, which is continued overnight while allowing to warm to room temperature. Extraction with methylene chloride gives a glass (yield 550 mg., 71%).

Step B: Preparation of 5'-(1-adamantamido)-5'-deoxyadenosine.—The above product (500 mg.) is dissolved in 50% formic acid solution (3 ml.) and left for two days at room temperature. Evaporation under vacuum gives a foam, which crystallizes from aqueous ethanol (yield 250 mg., 56%), M.P. 129–130° C.

*Analysis.*—Calcd. for $C_{21}H_{28}N_6O_4 \cdot C_2H_6O$ (percent): C, 58.21; H, 7.22; N, 17.71. Found (percent): C, 58.51; H, 7.00; N, 17.70.

Similarly, the 5'-(2-adamantamido) - 5' - deoxyadenosine is obtained when using 2-admanatoyl chloride in place of 1-adamantoyl chloride.

EXAMPLE 10

5'-N-carboethoxyamino-5'-deoxyadenosine

Step A: Preparation of 5'-N-carboethoxyamino-5'-deoxy - 2',3' - O - isopropylideneadenosine.—5'-amino-5'-deoxy-2',3'-O-isopropylideneadenosine (450 mg.) is dissolved in a mixture of pyridine (2 ml.) and methylene chloride (20 ml.). Ethyl chloroformate (0.155 ml., 1.1 M.) is added dropwise to the stirred solution at 0° C. After stirring for one hour, the reaction mixture is stored overnight. Thin layer chromatography shows the reaction to be complete. The methylene chloride solution is washed three times with 20 ml. portions of water, dried, and evaporated under vacuum to give a gum, which is dissolved in toluene (10 ml.) and co-distilled twice. A colorless foam is obtained which is suitable for further transformations (yield 470 mg., 85%).

*Analysis.*—Calcd. for $C_{16}H_{22}N_6O_5$ (percent): C, 50.73; H, 5.86; N, 22.21. Found (percent): C, 50.69; H, 6.07; N, 21.90.

Step B: Preparation of 5' - N - carboethoxyamino-5'-deoxyadenosine.—5' - N - carboethoxyamino - 5' - deoxy-2'-3'-O-isopropylideneadenosine (400 mg.) is dissolved in formic acid (5 ml.) and water (5 ml.). This solution is set aside for 24 hours at room temperature, at which time thin layer chromatography shows hydrolysis of the isopropylidene group to be complete. Evaporation of the solvent under vacuum, and evaporation two times with 10 ml. portions of water, gives a gum which is re-dissolved in 5 ml. of water. After adjustment of the pH to 8–9, the solution is evaporated to a residue. Crystallization from ethanol gives needless, M.P. 60–62° C. (yield 250 mg., 68%).

*Analysis.*—Calcd. for $C_{13}H_{18}N_6O_5$ (percent): C, 45.0; H, 5.45; N, 24.22. Found (percent): C, 44.84; H, 5.55; N, 24.29.

EXAMPLE 11

5'-deoxy-5'-ureidoadenosine

Method A.—5'-amino - 5' - deoxy - 2',3' - O - isopropylideneadenosine (420 mg.) is dissolved in ethanol (5 ml.). To this solution is added potassium cyanate (250 mg.) in water (5 ml.). Glacial acetic acid (0.15 ml.) is added to the reaction mixture which is then warmed for 15 minutes on a steam bath. The solution is then evaporated under vacuum to an oil which is dissolved in 50% aqueous formic acid (4 ml.) and left at ambient temperatures for two days. Evaporation of the solvent under vacuum and re-evaporation twice with portions of water (10 ml.) gives another oil. Crystallization from aqueous ethanol gives micro-needles, M.P. 251° C. (overall yield 240 mg., 58%).

*Analysis.*—Calcd. for $C_{11}H_{15}N_7O_4$ (percent): C, 42.71; H, 4.89; N, 31.70. Found (percent): C, 42.52; H, 4.97; N, 31.01.

Method B.—5'-amino - 5' - deoxyadenosine hydrochloride (400 mg.) and potassium cyanate (400 mg.) are dissolved in water (10 ml.) and heated for 15 minutes on a steam bath. The solution is filtered and concentrated to a volume of 2–3 ml., whereupon ethanol (10–20 ml.) is added. A white solid separates. Crystallization from water gives the urea (yield 300 mg., 80%), M.P. 251–252° C.

Method C.—5'-cyanamido - 5' - deoxy - 2',3' - O - isopropylideneadenosine (250 mg.) is dissolved in 50% aqueous formic acid solution (10 ml.) and left for two days at ambient temperatures. Evaporation of the solvent under vacuum and re-evaporation of the residue twice with portions of water (10 ml.) give an oil. Crystallization from aqueous ethanol gives needles, M.P. 251° C. (yield 170 mg., 91%).

The product obtained from methods A, B, and C are identical in all respects.

EXAMPLE 12

5'-cyanamido-5'-deoxy-2',2'-O-isopropylideneadenosine

5'-amino - 5' - deoxy - 2',3' - O - isopropylideneadenosine (612 mg.) is dissolved in ethanol (5 ml.). To this solution is added, while stirring, a methanolic solution (5 ml.) of cyanogen bromide (117 mg., 1.1 M). The reaction mixture is warmed to reflux and left at room temperature for 1–3 hours. The solution is evaporated under vacuum and redissolved in methylene chloride. The solution is washed three times with 10 ml. portions of water, dried, and evaporated to a white solid under vacuum. Crystallization from a mixture of methylene chloride and petroleum ether gives needles, M.P. 112° C., which loses methylene chloride at 65° C. (yield 300 mg., 72%).

*Analysis.*—Calcd. for $C_{14}H_{17}N_7O_3$ (percent): N, 29.6. Found (percent): N, 29.1.

EXAMPLE 13

5'-deoxy-5'-guanidinoadenosine hydrochloride

Step A: Preparation of 5'-deoxy - 5' - guanidino-2',3'-O-isopropylideneadenosine.—5'-cyanamido - 5' - deoxy-2',3' - O - isopropylideneadenosine-methylene chloride (250 mg.), and anhydrous ammonium chloride (35 mg., 1.1 equivalents) are refluxed in concentrated ammonia solution for one hour. On cooling, the solution is taken to dryness under vacuum.

Step B: Preparation of 5'deoxy - 5' - guanidinoadenosine hydrochloride.—The residue from Step A is dissolved in formic acid (5 ml.) and water (5 ml.) and left for two days. Formic acid is completely removed by exhaustive evaporation under vacuum with four portions of water (5 ml.). The product is crystallized from aqueous ethanol (yield 200 mg., 96%), M.P. 150–170° C. (dec).

*Analysis.*—Calculated for $C_{11}H_{17}N_8O_3Cl$ (percent): C, 39.3; H, 4.97; N, 32.45. Found (percent): C, 40.7; H, 5.23; N, 32.08.

EXAMPLE 14

5'-(3-n-butylguanidino-5'-deoxyadenosine hydrochloride

5' - cyanamido-5'-deoxy-2',3'-O-isopropylidene-adenosine-methylene chloride (250 mg.) and ammonium chloride (35 mg.) are refluxed for one hour in a mixture of butylamine (5 ml.) and water (5 ml.). On cooling, the solution is evaporated under vacuum to give a residue which is dissolved in a mixture of formic acid (5 ml.) and water (5 ml.). Formic acid is removed by exhaustive evaporation under vacuum using six 5 ml. portions of water. A glass is obtained on evaporation of the residual oil from aqueous ethanol (yield 180 mg., 69%).

*Analysis.*—Calcd. for $C_{15}H_{25}N_8O_3Cl \cdot \frac{1}{2}C_2H_6 \cdot \frac{1}{2}H_2O$ (percent): C, 44.5; H, 6.80; N, 25.9. Found (percent): C, 44.57; H, 7.33; N, 26.19.

EXAMPLE 15

5'-azido-5'-deoxy-$N^6$-(2-isopentenyl)adenosine

Step A: Preparation of $N^6$-(2-isopentenyl)2',3'-O-isopropylideneadenosine.—$N^6$-isopentenyladenosine (8 g.) is suspended in 200 ml. of acetone. Dimethoxypropane (200 ml.) and methanesulfonic acid (1 ml.) is then added, and the mixture stirred at room temperature overnight. Concentrated ammonium hydroxide (10 ml.) is then added and the mixture is concentrated to a small volume. This is partitioned between water and methylene chloride and the organic layer is dried and filtered. The filtrate is concentrated to a small volume and hexane is added. Crystals separate, M.P. 90–92° C. (yield 5.8 g.).

Step B: Preparation of $N^6$-(2-isopentenyl)-2',3'-O-isopropylidene-5'-tosyladenosine.—$N^6$ - (2 - isopentenyl)-2', 3'-O-isopropylideneadenosine (4.6 g.) is dissolved in 120 ml. of pyridine at 0° C. Tosyl chloride (8 g.) is added, and the mixture is placed in a refrigerator at −18° C. for 48 hours. The product is then poured into ice water, extracted with chloroform, and the chloroform extract is washed with cold dilute sulfuric acid and then with ice water. The chloroform layer is then dried over sodium sulfate and filtered. The filtrate is concentrated to dryness under vacuum. The residue obtained in 95% pure product by thin layer chromatography (yield 4.5 g.).

Step C: Preparation of 5'-azido-5'-deoxy-2',3'-O-isopropylidene - $N^6$ - (2 - isopentenyl) - adenosine.—The $N^6$-(2-isopentenyl)-2',3'-O-isopropylidene - 5' - tosyladenosine (500 mg.) is dissolved in 5 ml. of dimethyl sulfoxide, and sodium azide (350 mg.) is added. The mixture is heated at 100° C. on a hot plate for 30 minutes. The product is poured into ice water, and then extracted with methylene chloride. The extract is washed twice with water, dried, and then evaporated under vacuum. Thin layer chromatography shows a single spot at the same $R_f$ as the starting material, however a large azido band is observed at 4.8 microns. Chromatography over silica gel by eluting with 1% methanol in methylene chloride affords 300 mg. of 5'-azido-5'-deoxy-2',3'-O-isopropylidene-$N^6$-(2-iscopentenyl)-andenosine as a brown oil.

Step D: Preparation of 5'-azido-5'-deoxy-$N^6$-(2-isopentenyl) - adenosine.—5'-azido-5'-deoxy-2',3'-O-isopropylidene-$N^6$-(2-isopentenyl)-adenosine (600 mg.) is dissolved in 5 ml. of a mixture of formic acid and water (1:1). This mixture is left at room temperature for 48 hours and then evaporated to dryness. The residue is flushed twice with water and then twice with ethanol. It is then taken up in methylene chloride and placed on a silica gel column. It is eluted first with methylene chloride and then with 5% methanol-methylene chloride mixture. The third fraction contains nearly all of the material. This is taken up in ethanol and water is added. The crystals which appear are filtered and washed with a 50:50 mixture of water and ethanol. After drying, 250 mg. are obtained. After recrystallization from benzene the M.P. is 106–108° C.

*Analysis.*—Calculated for $C_{15}H_{20}N_8O_3$ (percent): C, 49.99; H, 5.59; N, 31.10. Found (percent): C, 49.85; H, 5.45; N, 30.95.

EXAMPLE 16

6-methylmercapto-9-(5-azido-5-deoxy-β-D-ribofuranosyl)purine

Step A: Preparation of 6-methylmercapto-9-(2,3-O-isopropylidene - 5 - tosyl-β-D-ribofuranosyl)purine.—6-methylmercapto - 9 - (2,3-O-isopropylidene-5-β-D-dibofuranosyl)purine (500 mg.) is dissolved in pyridine (10 ml.) at −16° C., and tosyl chloride (350 mg.) is added. The mixture is shaken until it dissolves, and then allowed to stand overnight at −18° C. The product is chromatographed over silica gel to obtain 6-methylmercapto-9-(2,3-O - isopropylidene-5-tosyl-β-D-ribofuranosyl)purine 940 mg.).

Step B: Preparation of 6-methylmercapto-9-(5-azido-5-deoxy - 2,3 - O - isopropylidene - β - D - ribofuranosyl)-purine.—6-methylmercapto - 9 - (2,3-O-isopropylidene-5-tosyl-5-deoxy-β-D-ribofuranosyl)purine (2.5 g.) is dissolved in 25 ml. of dry dimethyl sulfoxide, and sodium azide (1.5 g.) is added. The mixture is shaken and heated on a steam bath for 30 minutes. It is then poured into ice water and the precipitate that is formed is filtered. The residue is taken up in 100 cc. of ether and is dried and concentrated to 25 cc. Then 25 cc. of petroleum ether is added and the crystals which form are filtered to give the product, M.P. 89.5–90.5° C. (yield 1.2 g., 66%).

Step C: Preparation of 6-methylmercapto-9-(5-azido-5-deoxy-β-D-ribofuranosyl)purine.—The above product (800 mg.) in 20 ml. of 1:1 formic acid in water is allowed to stand for 24 hours at room temperature. The product is then evaporated to dryness under vacuum and dried azeotropically by evaporation with ethanol, and then with benzene. The crude product (650 mg.) is obtained as a foam. The product is chromatographed on silica gel with 3% methanol in methylene chloride.

*Analysis.*—Calculated for $C_{11}H_{13}N_7SO_3$ (percent): C, 40.86; H, 4.06; N, 30.32; S, 9.92. Found (percent): C, 41.67; H, 4.24; N, 29.45; S, 9.59.

EXAMPLE 17

5'-deoxy-5-thioureidoadenosine 5-amino - 5 - deoxyadenosine hydrochloride (400 mg.) and potassium thiocyanate (400 mg.) are dissolved in water (10 ml.) and heated for 15 minutes on a steam bath. The solution is filtered and concentrated to a volume of 2–3 ml., whereupon ethanol (10–20 ml.) is added. The 5'-deoxy - 5 - thioureidoadenosine separates and is recovered.

EXAMPLE 18

Following the procedures of Example 1 through Example 6, but starting with an equivalent quantity of the appropriately substituted 9 - (2,3-O-isopropylidene-5-O-tosyl-β-D-ribofuranosyl)purine there is obtained, for example, the following compounds. The N-formyl derivative is employed whenever a primary or secondary amine group is present on the purine ring.

6-benzylamino - 9 - (5 - acetylthio - 5 - deoxy-β-D-ribofuranosyl)purine, 6 - methylamino - 9 - (5-acetylthio - 5 - deoxy-β-D-ribofuranosyl)purine, 2,6-diamino-9 - (5 - acetylthio - 5 - deoxy-β-D-ribofuranosyl)-purine, 6 - dimethylamino - 9 - (5 - acetylthio-5-deoxy-β-D-ribofuranosyl)purine, 6 - benzylmercapto - 9 - (5-acetylthio - 5 - deoxy-β-D-ribofuranosyl)purine, 6-methylmercapto - 9 - (5 - acetylthio - 5 - deoxy-β-D-ribofuranosyl)purine;

6-benzylamino - 9 - (5 - methylamino - 5 - deoxy-β-D-ribofuranosyl)purine, 6 - methylamino - 9 - (5-methylamino - 5 - deoxy-β-D-ribofuranosyl)purine, 2,6-diamino - 9 - (5 - methylamino - 5 - deoxy-β-D-ribofuranosyl)purine;

6-dimethylamino - 9 - (5 - dimethylamino - 5 - deoxy-β-D-ribofuranosyl)purine, 6 - benzylmercapto - 9 - (5-dimethylamino - 5 - deoxy-β-D-ribofuranosyl)purine, 6-methylmercapto - 9 - (5 - dimethylamino - 5 - deoxy-β-D-ribofuranosyl)purine;

6 - benzylamino - 9 - (5 - azido - 5 - deoxy-β-D-ribofuranosyl)purine, 2,6 - diamino - 9 - (5 - azido-5-deoxy-β-D-ribofuranosyl-purine, 6 - benzylmercapto-9-(5-azido-5-deoxy-β-D-ribofuranosyl)purine;

6 - benzylamino - 9 - (5 - thiocyano - 5 - deoxy-β-D-ribofuranosyl)purine, 6 - methylamino - 9 - (5 - thiocyano - 5 - deoxy-β-D-ribofuranosyl)purine, 2,6 - diamino - 9 - (5 - thiocyano - 5 - deoxy-β-D-ribofuranosyl)purine, 6 - dimethylamino - 9 - (5 - thiocyano-5 - deoxy-β-D-ribofuranosyl)purine, 6 - benzylmercapto - 9 - (5 - thiocyano - 5 - deoxy-β-D-ribofuranosyl)purine, 6 - methylmercapto - 9 - (5 - thiocyano-5-deoxy-β-D-ribofuranosyl)purine.

The 2,3-O-isopropylidene - 5 - O-tosyl-β-D-ribofuranosyl derivative of the nucleoside is prepared in each instance from the nucleoside by following the procedures of Example 15, Steps A and B.

EXAMPLE 19

Following the procedures of Example 8 through Example 14, but starting with an equivalent quantity of the appropriate 2-and/or 6-substituted - 9 - (5 - amino-5 - deoxy-β-D-ribofuranosyl)purine, there is obtained, for example:

6 - methylamino - 9 - (5 - acetamido - 5 - deoxy-β-D-ribofuranosyl)purine, 6 - methylamino - 9 - (5-[1-adamantamido] - 5 - deoxy-β-D-ribofuranosyl)purine, 6 - methylamino - 9 - (5 - carboethoxy - 5 - deoxy-β-D-ribofuranosyl)purine;
6-benzylamino - 9 - (5 - ureido - 5 - deoxy-β-D-ribofuranosyl)purine, 6 - benzylamino - 9 - (5 - thioureido-5 - deoxy-β-D-ribofuranosyl)purine;
6-dimethylamino - 9 - (5 - cyanamido - 5 - deoxy-β-D-ribofuranosyl)purine, 6 - dimethylamino - 9 - (5 - guanidino - 5 - deoxy-β-D-ribofuranosyl)purine;
$N^6$-(2 - isopentenyl)amino - 9 - (5 - acetamido - 5 - deoxy-β-D-ribofuranosyl)purine, $N^6$ - (2 - isopentenyl)amino - 9 - (5 - [1 - adamantamido] - 5 - deoxy-β-D-ribofuranosyl)purine, $N^6$ - (2 - isopentenyl)amino - 9 - (5-ureido - 5 - deoxy-β-D-ribofuranosyl)purine, $N^6$-(2-isopentenyl)amino - 9 - (5 - guanidino - 5 - deoxy-β-D-ribofuranosyl)purine;
2,6 - diamino - 9 - (5 - carboethoxy - 5 - deoxy-β-D-ribofuranosyl)purine, 2,6 - diamino - 9 - (5 - ureido-5-deoxy-β-D-ribofuranosyl)purine;
2 - amino - 6 - hydroxy - 9 - (5 - thioureido - 5 - deoxy-β-D-ribofuranosyl)purine, 2 - amino - 6 - hydroxy - 9- (5 - [3 - n-butylguanidino] - 5 - deoxy-β-D-ribofuranosyl)purine.

The appropriate 2 and/or 6-substituted - 9 - (5-amino-5 - deoxy-β-D-ribofuranosyl)purine is obtained from the corresponding 9 - (β-D-ribofuranosyl)purine in each instance by following the procedures of Example 4, Steps A and B.

EXAMPLE 20

5'-azido-5'-deoxy-5-bromouridine

To 5'-azido - 5' - deoxyuridine (389 mg. 1.45 mmoles), obtained according to the method described by J. Horwitz et al., J. Am. Chem. Soc. 27, 3045 (1962), in 6 ml. of water is added 480 mg. (3 mmoles) of bromine. The mixture is stirred for 48 hours at room temperature. The reaction mixture is then concentrated to dryness and dried azeotropically with benzene. The crude oil is chromatographed on silica gel using a mixture of 20% methanol in methylene chloride to obtain a yield of 50 mg. of 5' - azido - 5' - deoxy - 5 - bromouridine, M.P. 183–184° C.

Analysis.—Calculated for $C_9H_{10}O_5N_5Br$ (percent): C, 31.14; H, 2.90; N, 20.18; Br, 23.02. Found (percent): C, 31.58; H, 2.99; N, 19.90; Br, 22.61.

EXAMPLE 21

5'-azido-5'-deoxy-5-methylmercaptouridine

A slow stream of gaseous methyl mercaptan is passed into a mixture of 150 ml. of absolute ethanol 0.05 mole of potassium t-butoxide until an excess of the mercaptan has been absorbed. Then 0.01 mole of 5'-azido-5'-deoxy-5-bromouridine is added and the resulting mixture is heated at reflux for 65 hours. The cooled reaction mixture is treated successively with 75 ml. of methanol-washed Dowex 50 WX4 (H+) resin and 150 ml. of Dowex 3 (OH—) resin. Evaporation of the solvent, and chromatography of the residue on a column of 250 g. of silica gel yields 5'-azido-5'-deoxy-5-methylmercaptouridine.

Similarly, when the methyl mercaptan is replaced by ethyl mercaptan or benzylmercaptan, the corresponding 5' - azido - 5' - deoxy - 5 - ethylmercapto (or benzylmercapto)uridine is obtained.

In accordance with the above procedure, but starting with 5' - amino - 5' - deoxy - 5 - bromouridine, 5'-methylamino - 5' - deoxy - 5 - bromouridine, or the 2',3'-O-isopropylidene or 2',3' - di-O-benzyl-derivatives thereof, the corresponding 5' - amino - 5' - deoxy - 5 - methyl- mercaptouridine, 5' - methylamino - 5' - deoxy - 5 - methylmercaptouridine, or the 2',3' - O-isopropylidene or 2',3'-di-O-benzyl-derivatives thereof are obtained.

EXAMPLE 22

5'-amino-5'-deoxy-5-methylaminouridine

A mixture of 5'-azido-5'-deoxy-5-bromouridine (2 g.) and 20 ml. of anhydrous liquid methylamine is heated in a sealed tube at 80° C. for 20 hours. After evaporation of the excess methylamine, the crude product in water is added to a column of 200 ml. of Dowex 50WX4 (H+) resin. After washing the column with water, the column is eluted with 0.5 N ammonium hydroxide solution. Evaporation of the ammoniacal eluates furnishes 5'-amino-5'-deoxy-5-methylaminouridine.

In accordance with the above procedure, but starting with 5'-amino-(or 5'-methylamino)-5'-deoxy-5-bromouridine, or with the 2',3'-O-isopropylidene or 2,3-O-benzyl-derivatives, there is obtained 5'-amino-(or 5'-methylamino)-5'-deoxy-5-methylaminouridine, or the 2',3'-O-isopropylidene or 2',3'-O-benzyl derivatives respectively.

Similarly, when methylamine is replaced by ammonia, ethylamine, or dimethylamine, the corresponding 5'-azido-5'-deoxy-5-amino(ethylamino or dimethylamino)-uridine is obtained.

EXAMPLE 23

5'-azido-5'-deoxycytidine

A mixture of 5'-azido-5'-deoxy-2',3'-di-O-acetyluridine (0.01 mole), as prepared by Horwitz et al., J. Org. Chem. 27, 3046 (1962), phosphorous pentasulfide (0.04 mole), and 50 ml. of anhydrous pyridine is heated at reflux for 3.5 hours. The reaction mixture is poured into 400 g. of ice and stirred for 1.0 hour. The crude reaction product is filtered, and then precipitated from a solution in hot pyridine by the addition of water. The product, 5' - azido-5'.deoxy-2',3'-di-O-acetyl-4-thiouridine is dried thoroughly under vacuum over phosphorous pentoxide.

The product from the foregoing procedure (1.0 g.) is heated with 25 ml. of methanol, which has been saturated previously at 0° C. with ammonia, in a pressure bomb at 100° C. for 20 hours. Evaporation of the solvent furnishes a residue which contains 5'-azido-5'-deoxycytidine.

In accordance with the above procedures, but using methylamine, ethylamine, or dimethylamine in place of ammonia, there is obtained the corresponding 1-(5'-azido-5'-deoxy-β-D-ribofuranosyl)-4-methylamino - 2(1H)-pyrimidione, 1 - (5' - azido - 5'-deoxy-β-D-ribofuranosyl)-4-ethylamino-2(1H)-pyrimidinone, or 1-(5'-azido-5'-deoxy-β-D-ribofuranosyl) - 4 - dimethylamino - 2(1H)-pyrimidione, respectively.

EXAMPLE 24

5'-deoxy-5'-fluoroadenosine

Step A: Preparation of 5'-deoxy-5'-fluoro-$N^6$-formyl-2',3'-O-isopropylideneadenosine.—A mixture of $N^6$-formyl-2',3'-O-isopropylidene-5'-O-tosyladenosine (5 g.), potassium fluoride dihydrate (6 g.) and methanol (100 ml.) are heated in a bomb with a glass liner for one hour at 150° C. After filtering, the methanol is removed by evaporation and the residue is partitioned between methylene chloride and water. The organic layer is chromatographed on a silica gel column, using methanol-methylene chloride mixtures to develop and isolate the desired compound, 5' - deoxy - 5' - fluoro - $N^6$ - formyl-2',3'-O-isopropylideneadenosine.

Step B: Preparation of 5'-deoxy-5'-fluorodeoxyadenosine.—The product from Step A is dissolved in formic acid (5 ml./g.) and an equal volume of water is added. After the blocking groups have been removed, as judged by thin layer chromatography and ultraviolet absorption spectroscopy, the solvent is removed in vacuo and the residue subjected to chromatography on silica gel to obtain pure 5'-deoxy-5'-fluoroadenosine.

We claim:
1. A compound having the following formula or the 2',3' - O - isopropylidone or 2',3'-O-diacetyl derivatives thereof:

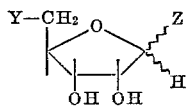

wherein Y is

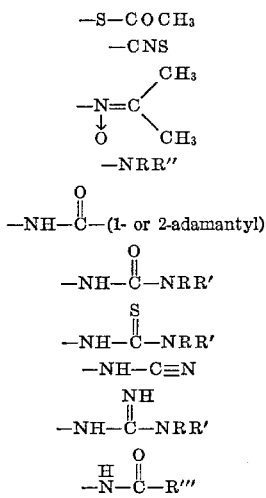

where R and R' are each hydrogen or loweralkyl, R" is loweralkyl, and R''' is an alkyl group having 2–6 carbon atoms; and where Z is either a purine moiety having the following structure:

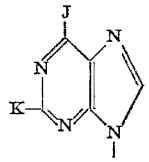

where J and K are the same or different, hydrogen, halogen, hydroxy, mercapto, loweralkylmercapto, benzylmercapto, amino, loweralkylamino, or benzylamino; or Z is a pyrimidine moiety having the following structure:

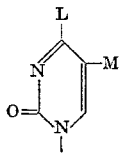

where L is loweralkoxy, hydroxy, amino, or loweralkylamino, and M is hydrogen, loweralkyl, halogen, haloloweralkyl, amino, loweralkylamino, benzylamino, mercapto, loweralkylmercapto, or benzylmercapto.

2. A compound of claim 1 where J is amino and K is hydrogen.

3. A compound of claim 2 wherein Y is adamantanoyl-1, said compound being named 5'-(1-adamantoylamino)-5'-deoxyadenosine.

4. A compound of claim 2 wherein Y is N-carboethoxyamino, said compound being named 5'-N-carboethoxyamino-5'-deoxyadenosine.

5. A compound of claim 2 wherein Y is ureido, said compound being named 5'-deoxy-5'-ureidoadenosine.

6. A comopund of claim 2 wherein Y is 3-n-butylguanidino, said compound being named 5'-(3-n-butylguanidino)-5'-deoxyadenosine.

7. A process for the preparation of a compound having the following formula:

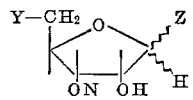

where Y is —CNS, —N$_3$, —NRR', or

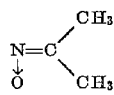

and R and R' are each hydrogen or loweralkyl; and Z is a purine or pyrimidine moiety, which comprises reacting a compound having the formula

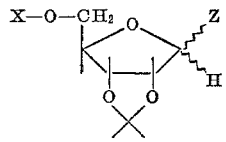

where X is mesyl, tosyl or benzenesulfonyl, and Z is a purine or pyrimidine moiety, with an alkali metal thiocyanate, alkali metal azide, alkyl-substituted-amino or acetone oxime, respectively, wherein the compound where Y is N$_3$ may be reduced to a compound where Y is NH$_2$.

8. A process for preparing a compound having the following formula:

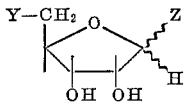

where Y is

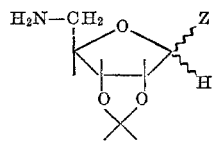

or —NH—C≡N, and R and R' are each hydrogen or loweralkyl; and Z is a purine or pyrimidine moiety, which comprises reacting a compound of the formula

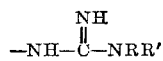

where Z is a purine or pyrimidine moiety with an anhydride, alkyl chloroformate, alkali metal cyanate, alkali metal thiocyanate, or cyanogen halide, respectively, wherein compound where Y is —NH—C≡N may be reacted with ammonia or an amine to produce a compound where Y is $$-NH-\overset{NH}{\underset{}{C}}-NRR'$$

References Cited

UNITED STATES PATENTS

| 3,475,408 | 10/1969 | Kuhn et al. | 260—211.5 |
| 2,875,194 | 2/1959 | Baker et al. | 260—211.5 |
| 3,225,029 | 12/1965 | Yamaoka | 260—211.5 |
| 3,300,478 | 1/1967 | Wechter | 260—211.5 |

FOREIGN PATENTS

| 782,440 | 9/1957 | Great Britain | 260—211.5 |
| 1,101,108 | 1/1968 | Great Britain | 260—211.5 |

ELBERT L. ROBERTS, Primary Examiner

J. R. BROWN, Assistant Examiner

U.S. Cl. X.R.

260—999

UNITED STATES PATENT OFFICE
CERTIFICATE OF CORRECTION

Patent No. __3,575,959__    Dated __April 20, 1971__

Inventor(s) __T. Y. Shen, W. V. Ruyle, and Thomas Neilson__

It is certified that error appears in the above-identified patent and that said Letters Patent are hereby corrected as shown below:

In Column 15, Claim 1, line 2, "isopropylidone" should read -- isopropylidene --.

In Colunn 16, Claim 7, that portion of the formula

     should read     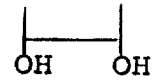

In Column 16, Claim 8, the phrase "wherein compound" should read -- wherein the compound --.

Signed and sealed this 19th day of October 1971.

(SEAL)
Attest:

EDWARD M. FLETCHER, JR.          ROBERT GOTTSCHALK
Attesting Officer                Acting Commissioner of Pate